United States Patent
Lai et al.

(10) Patent No.: US 9,817,548 B2
(45) Date of Patent: Nov. 14, 2017

(54) PROVIDING ENHANCED USER INTERFACES

(71) Applicant: Citrix Systems, Inc., Fort Lauderdale, FL (US)

(72) Inventors: Jannie Lai, Monte Sereno, CA (US); Lin Cao, Fort Lauderdale, FL (US); Uday Gajendar, Menlo Park, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 251 days.

(21) Appl. No.: 14/253,069

(22) Filed: Apr. 15, 2014

(65) Prior Publication Data

US 2014/0344754 A1     Nov. 20, 2014

Related U.S. Application Data

(60) Provisional application No. 61/825,161, filed on May 20, 2013.

(51) Int. Cl.
*G06F 3/0482* (2013.01)
*G06F 3/0488* (2013.01)
(Continued)

(52) U.S. Cl.
CPC .......... *G06F 3/0482* (2013.01); *G06F 3/0481* (2013.01); *G06F 3/0485* (2013.01); *G06F 3/04817* (2013.01); *G06F 3/04842* (2013.01)

(58) Field of Classification Search
CPC .. G06F 3/0482; G06F 3/0481; G06F 3/04817; G06F 3/04842; G06F 3/0485
See application file for complete search history.

(56) References Cited

U.S. PATENT DOCUMENTS

| 6,429,883 | B1 * | 8/2002 | Plow | G06F 3/0481 715/768 |
| 6,918,091 | B2 * | 7/2005 | Leavitt | G06F 3/04817 715/765 |

(Continued)

FOREIGN PATENT DOCUMENTS

| EP | 1883009 A2 | 1/2008 | |
| WO | WO 2005029312 A1 * | 3/2005 | G06F 3/048 |

OTHER PUBLICATIONS

Woody Leonhard, "Windows 7 All-In-One for Dummies", 2009, Wiley Publishing, Inc., pp. i, ii, 247-268.*

(Continued)

*Primary Examiner* — Nicholas Klicos
(74) *Attorney, Agent, or Firm* — Banner & Witcoff, Ltd.

(57) ABSTRACT

Methods, systems, computer-readable media, and apparatuses for providing enhanced user interfaces are presented. In some embodiments, a computing device may generate a user interface that presents a selectable control element. Subsequently, the computing device may receive input selecting the control element. In response to receiving the input selecting the control element, the computing device may update the user interface to present a ring that includes at least one band of icons. In addition, the ring may have a first portion that is visible and a second portion, different from the first portion, that is hidden. In some instances, the computing device then may receive a selection of an icon included in the at least one band of icons. In response to receiving the selection of the icon, the computing device may update the user interface to hide the ring.

20 Claims, 10 Drawing Sheets

(51) Int. Cl.
*G06F 3/0481* (2013.01)
*G06F 3/0484* (2013.01)
*G06F 3/0485* (2013.01)

(56) References Cited

U.S. PATENT DOCUMENTS

| | | | | |
|---|---|---|---|---|
| 7,551,899 B1* | 6/2009 | Nicolas | ........... | H04M 1/274558 379/355.01 |
| 8,291,332 B2* | 10/2012 | Chaudhri | .............. | G06F 3/0481 715/764 |
| 8,495,514 B1* | 7/2013 | Ludolph | ............... | G06F 3/0481 715/768 |
| 2001/0035882 A1* | 11/2001 | Stoakley | ............... | G06F 3/0481 715/779 |
| 2003/0043206 A1* | 3/2003 | Duarte | ................. | G06F 3/0482 715/810 |
| 2005/0278647 A1* | 12/2005 | Leavitt | ............... | G06F 3/04817 715/765 |
| 2006/0061597 A1* | 3/2006 | Hui | ...................... | G06F 3/0481 345/629 |
| 2006/0095865 A1* | 5/2006 | Rostom | ................ | G06F 3/0482 715/810 |
| 2007/0136681 A1* | 6/2007 | Miller | ................. | G06F 3/04817 715/782 |
| 2007/0150810 A1* | 6/2007 | Katz | ..................... | G06F 3/0481 715/229 |
| 2008/0163119 A1* | 7/2008 | Kim | ................... | G06F 3/04886 715/840 |
| 2009/0187860 A1* | 7/2009 | Fleck | ................... | G06F 3/0482 715/834 |
| 2009/0193364 A1* | 7/2009 | Jarrett | ................ | G06F 3/04817 715/838 |
| 2010/0192102 A1* | 7/2010 | Chmielewski | ...... | G06F 3/04817 715/834 |
| 2010/0192104 A1* | 7/2010 | Lee | ......................... | G10H 1/46 715/834 |
| 2010/0251179 A1* | 9/2010 | Cragun | .............. | G06F 3/04812 715/834 |
| 2010/0333030 A1* | 12/2010 | Johns | .................. | G06F 3/04815 715/834 |
| 2011/0018827 A1* | 1/2011 | Wang | .................... | G06F 3/0482 345/173 |
| 2011/0055760 A1* | 3/2011 | Drayton | ................ | G06F 3/0482 715/834 |
| 2011/0138314 A1* | 6/2011 | Mir | ....................... | G06F 9/4445 715/779 |
| 2012/0079427 A1* | 3/2012 | Carmichael | ......... | G06F 3/04817 715/825 |
| 2012/0226978 A1* | 9/2012 | Harberts | ............... | G06F 3/0482 715/702 |
| 2012/0311498 A1* | 12/2012 | Kluttz | ................... | G06F 3/0481 715/825 |
| 2013/0016042 A1* | 1/2013 | Makinen | ................. | G06F 3/016 345/168 |
| 2013/0019172 A1* | 1/2013 | Kotler | ................... | G06F 3/0482 715/711 |
| 2013/0104079 A1* | 4/2013 | Yasui | .................... | G06F 3/0482 715/834 |
| 2013/0339904 A1* | 12/2013 | Geithner | ............... | G06F 3/0482 715/834 |
| 2014/0075388 A1* | 3/2014 | Kuscher | ................ | G06F 3/0482 715/834 |
| 2014/0082557 A1* | 3/2014 | Warner | ............... | G06F 3/04817 715/834 |
| 2014/0210795 A1* | 7/2014 | Mattes | .................. | G06F 3/0421 345/175 |
| 2014/0331168 A1* | 11/2014 | Wang | .................... | G06F 3/0482 715/779 |

OTHER PUBLICATIONS

The How-To Geek, "The Power User's Guide to the Windows 7 Taskbar", May 6, 2010, accessed on Sep. 2, 2016, accessed from <http://lifehacker.com/5532578/the-power-users-guide-to-the-windows-7-taskbar>, pp. 1-9.*

Twinkle Thomas, "How to Enable or Disable the Auto Hide Feature of the Taskbar in Windows 7", Oct. 27, 2012, accessed on Sep. 2, 2016, accessed from <https://www.youtube.com/watch?v=Xv28nwo720s>, 0:00-0:48.*

"Group Similar Buttons on the Taskbar," Jan. 18, 2013, retrieved from http://web.archive.org/web/20130118013222/http://windows.microsoft.com/en-US/windows-vista/Group-similar-buttons-on-the-taskbar.

Wong, Eric, "Circle Dock 0.9.2—Desktop Application Launcher for Windows," Dec. 14, 2012, retrieved from https://www.youtube.com/watch?v-U0Kirs.

* cited by examiner

PROVIDING ENHANCED USER INTERFACES

CROSS-REFERENCE TO RELATED APPLICATIONS

This application claims the benefit of U.S. Provisional Patent Application Ser. No. 61/825,161, filed May 20, 2013, and entitled "PROVIDING ENHANCED USER INTERFACES," and which is incorporated by reference herein in its entirety.

BACKGROUND

Aspects of the disclosure relate to computer hardware and software. In particular, one or more aspects of the disclosure generally relate to computer hardware and software for providing enhanced user interfaces.

Various kinds of computing devices, from personal computers to mobile devices, are becoming increasingly popular. In addition, people are increasingly using these devices for both business purposes and personal uses. As these devices continue to grow in popularity and people continue to use them for an ever-growing number of reasons, the users of these devices have demanded and will continue to demand greater convenience, functionality, and ease-of-use from their computing devices and the computer software with which they interact.

SUMMARY

Aspects of the disclosure relate to various systems and techniques that provide more convenient, functional, and easy-to-use ways for users to interact with user interfaces provided by computing devices and/or computer software.

For example, some embodiments discussed in greater detail below are directed to techniques for providing enhanced user interfaces. In particular, in some arrangements discussed below, a user interface may be provided (e.g., by a computing device) that includes a partially-revealed ring comprising at least one row of icons, where a first portion of the ring is visible and a second portion of the ring, different from the first portion, is hidden. The icons included in the ring may be user-selectable to launch applications, open documents, and perform other actions. In addition, the ring may be rotated to selectively reveal other icons that may be included in the hidden portion of the ring. Rotating the ring may also result in some of the visible icons being hidden as they are moved out of the visible area of the user interface. In some embodiments, the ring may be displayed at an edge of a user interface, and the ring may be exposed or hidden in response to user input pulling the ring out of the edge of the user interface or pushing the ring back into the edge of the user interface, respectively.

In one or more other arrangements discussed below, a computing device may generate a user interface that presents a selectable control element. Subsequently, the computing device may receive input selecting the control element. In response to receiving the input selecting the control element, the computing device may update the user interface to present a ring that includes at least one band of icons. In addition, the ring may have a first portion that is visible and a second portion, different from the first portion, that is hidden. In some instances, the computing device then may receive a selection of an icon included in the at least one band of icons. In response to receiving the selection of the icon, the computing device may update the user interface to hide the ring.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be utilized, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

As noted above, certain embodiments are discussed herein that relate to providing enhanced user interfaces. Before discussing these concepts in greater detail, however, several examples of a computing device that may be used in implementing and/or otherwise providing various aspects of the disclosure will first be discussed with respect to FIG. 1.

Figure 1:
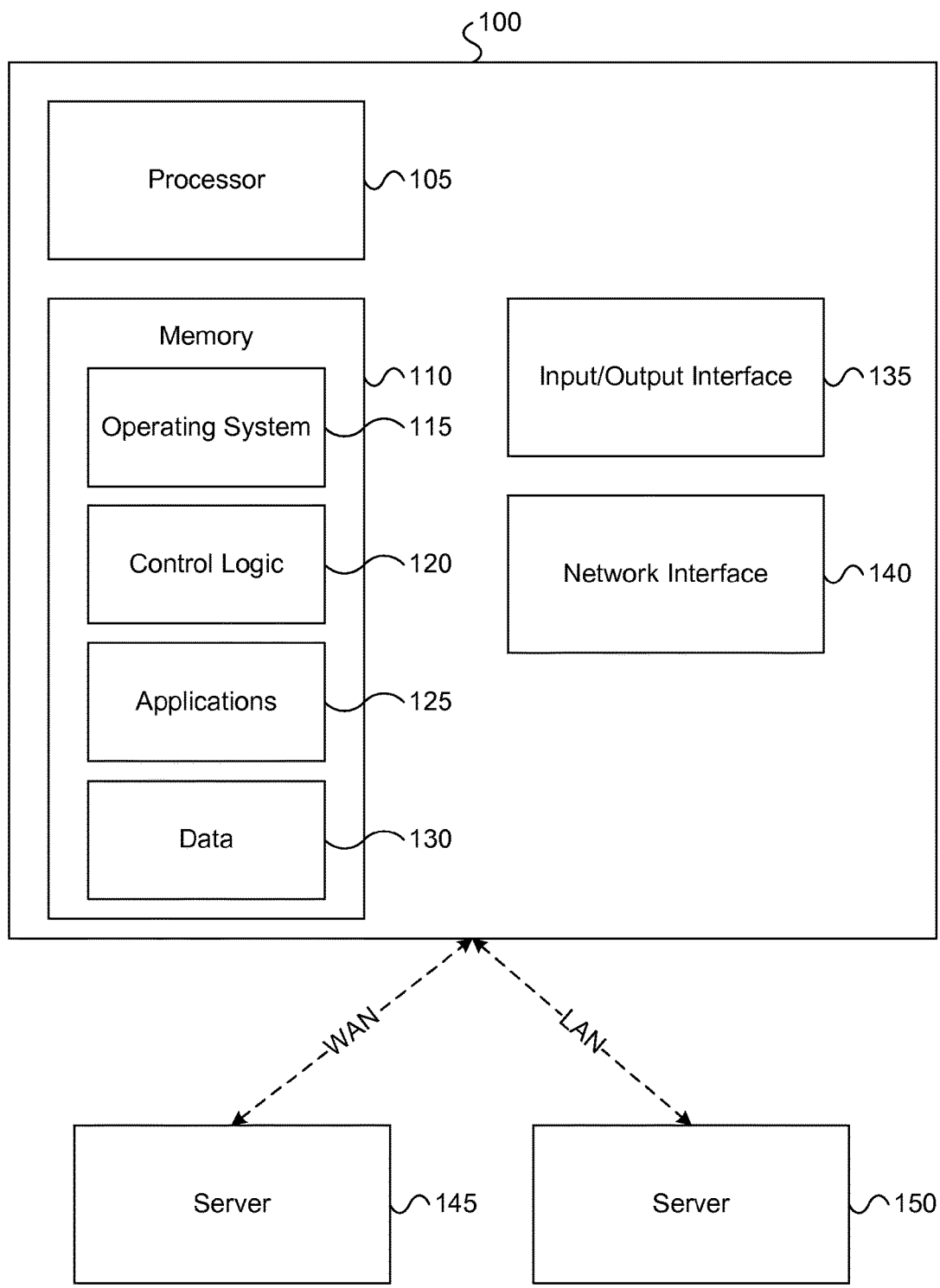
FIG. 1 depicts an example of a computing device that may be used in implementing one or more aspects of the disclosure in accordance with one or more illustrative aspects discussed herein.

FIG. 1 depicts an example of a computing device 100 that may be used in implementing one or more aspects of the disclosure in accordance with one or more illustrative aspects discussed herein. For example, computing device 100 may, in some instances, implement one or more aspects of the disclosure by reading and/or executing instructions and performing one or more actions accordingly. In one or more arrangements, computing device 100 may represent, be incorporated into, and/or include a desktop computer, a computer server, a mobile device (e.g., a laptop computer, a tablet computer, a smart phone, any other type of mobile computing device, etc.), and/or any other type of data processing device. Computing device 100 may, in some instances, operate in a standalone environment. In other instances, computing device 100 may operate in a networked environment. For example, computing device 100 may, in some instances, be connected to and/or otherwise in communication with one or more other computing devices that may be local to and/or physically remote from computing device 100.

As seen in FIG. 1, computing device 100 may, in some embodiments, include a processor 105, memory 110, an input/output interface 135, and a network interface 140. These are only some examples of the components and/or subsystems that may be included in computing device 100 in some embodiments. In other embodiments, computing device 100 may include two or more of any and/or all of these components (e.g., two or more processors, two or more memories, etc.) and/or other components and/or subsystems not listed here.

In some embodiments, processor 105 may control overall operation of computing device 100, including operation of one or more of the other components included in computing device 100, such as memory 110, input/output interface 135, and/or network interface 140. Memory 110 may, for instance, store software, instructions, data, and/or other information. For example, software may be stored in memory 110 and/or other storage to provide instructions to processor 105 for configuring the generic computing device 100 into a special purpose computing device in order to perform one or more of the various functions discussed herein.

In some arrangements, memory 110 may store, provide, and/or otherwise include an operating system 115, control logic 120, one or more applications 125, and/or data 130. Operating system 115 may, for example, control overall operation of computing device 100. Control logic 120 may, for instance, instruct computing device 100 and/or various components included therein, including processor 105, to perform and/or otherwise provide various aspects of the disclosure. The one or more applications 125 may, for example, provide secondary, support, and/or other functionalities that may be used in conjunction with various aspects of the disclosure. Additionally, data 130 may, for instance, be used in performing one or more aspects of the disclosure and, in some instances, may include one or more databases, data tables, and/or the like.

In some arrangements, input/output interface 135 may include a keyboard, mouse, display, printer, scanner, optical reader, stylus, and/or one or more other components. For example, input/output interface 135 may include various interface units and/or drives for reading, writing, displaying, and/or printing files and/or other data. In some embodiments, input/output interface 135 may include an audio interface that includes one or more microphones for capturing audio input and/or one or more speakers for providing audio output. Additionally or alternatively, input/output interface 135 may include a video display device for providing textual, audiovisual, and/or graphical output.

In some embodiments, at least one display included in and/or otherwise provided by input/output interface 135 may be a touch-sensitive display screen (also known as a "touch screen"). Such a touch screen may, for instance, be configured to display graphical content rendered and/or otherwise generated by computing device 100. In addition, the touch screen may be configured to receive user input from a user of computing device 100, including touch-based user input provided by the user using a stylus, finger, or other pointing aspect that is operated, controlled, and/or otherwise used by the user of the computing device 100 to interact with the touch screen.

As indicated above, computing device 100 may, in some instances, operate in a networked environment supporting connections to one or more remote computers, servers, and/or devices. Such connectivity may, in some embodiments, be provided by network interface 140. For example, network interface 140 may include one or more communication interfaces, ports, adapters, antennas, and/or other elements to facilitate various network connections. Such network connections may include local area network (LAN) connections, wide area network (WAN) connections (e.g., to the Internet), and/or any other types of connections. In some arrangements, LAN connections may be established and/or provided via a dedicated LAN interface and/or adapter, and/or WAN connections may be established and/or provided via a dedicated WAN interface and/or adapter. Other connections may, for example, be established and/or provided via other communication interfaces, such as wired communication interfaces (e.g., Ethernet), wireless communication interfaces (e.g., wireless LAN (WLAN), cellular, Bluetooth, etc.), and/or other communication interfaces.

As seen in FIG. 1, computing device 100 may, in some instances, be connected to and/or in communication with one or more servers, such as server 145 and server 150. Such servers may, for instance, implement one or more aspects of computing device 100 and, accordingly, may include one or more processors, memories, and/or the like. Some connections to the one or more servers may be established via a LAN (e.g., the connection between computing device 100 and server 145), while other connections to the one or more servers may be established via a WAN (e.g., the connection between computing device 100 and server 150). In some embodiments, some or all of the one or more servers may be virtual servers that are provided by software being executed on one or more computing devices.

In addition, one or more aspects of the disclosure may be embodied in computer-usable or readable data and/or computer-executable instructions, such as in one or more program modules, executed by one or more computers or other devices as discussed herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as discussed herein may be transferred between a source and a destination in the form of electromagnetic waves traveling through signal-conducting media such as metal wires, optical fibers, and/or wireless transmission media (e.g., air and/or space). Various aspects discussed herein may be embodied as a method, a data processing system, or a computer program product. Therefore, various functionality may be embodied in whole or in part in software, firmware, and/or hardware or hardware equivalents such as integrated circuits, field programmable gate arrays (FPGA), and the like. Particular data structures may be used to more effectively implement one or more aspects of the disclosure, and such data structures are contemplated as being within the scope of computer executable instructions and computer-usable data discussed herein.

Further, some aspects of the disclosure may also be operational with numerous other general purpose or special purpose computing system environments or configurations. Examples of other computing systems, environments, and/or configurations that may be suitable for use with aspects discussed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Having discussed several examples of the computing system architecture that may be used in providing and/or implementing various aspects of the disclosure, a number of embodiments will now be discussed in greater detail. In particular, and as introduced above, some aspects of the disclosure generally relate to providing enhanced user interfaces. In the description below, various examples illustrating how a user interface may be provided in accordance with one or more embodiments will be discussed.

Figure 2:
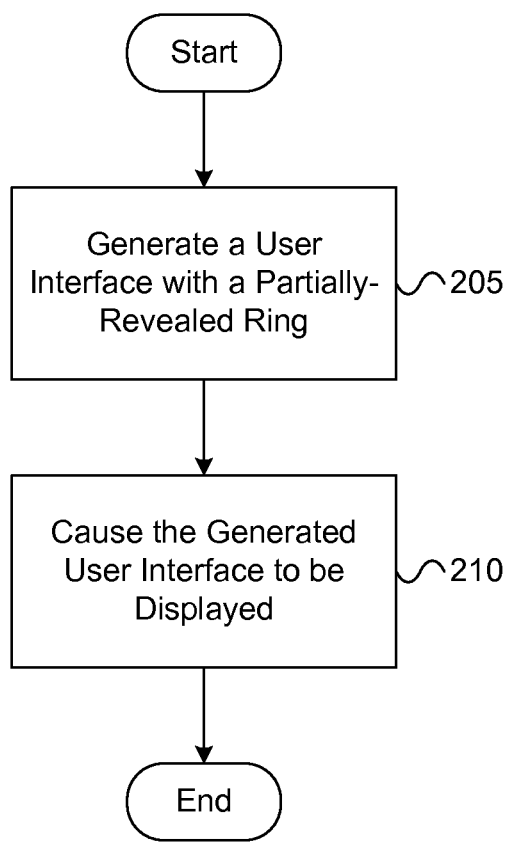
FIG. 2 depicts a flowchart that illustrates a method of providing an enhanced user interface in accordance with one or more illustrative aspects discussed herein.

FIG. 2 depicts a flowchart that illustrates a method of providing an enhanced user interface in accordance with one or more illustrative aspects discussed herein. In one or more embodiments, the method illustrated in FIG. 2 and/or one or more steps thereof may be performed by a computing device (e.g., generic computing device 100). Additionally or alternatively, the method illustrated in FIG. 2 and/or one or more steps thereof may, in some instances, be performed by a mobile device (which may implement one or more aspects of a computing device, such as generic computing device 100). In other embodiments, the method illustrated in FIG. 2 and/or one or more steps thereof may be embodied in computer-executable instructions that are stored in a computer-readable medium, such as a non-transitory computer-readable memory.

As seen in FIG. 2, the method may begin at step 205 in which a user interface may be generated (e.g., by a computing device, such as computing device 100, that is executing the method illustrated in FIG. 2). In one or more embodiments, the user interface that is generated may include a partially-revealed ring comprising at least one row of icons, where a first portion of the ring is visible and a second portion of the ring, different from the first portion, is hidden.

Subsequently, in step 210, the computing device (e.g., computing device 100) may cause the generated user interface to be displayed. For example, the computing device may cause the user interface that was generated in step 205 to be displayed on one or more display screens that are included in and/or connected to the computing device. Additionally or alternatively, the computing device may cause the user interface that was generated in step 205 to be displayed on another computing device and/or a display screen coupled to another computing device, such as a remote computing device.

In some embodiments, the ring included in the user interface may comprise a single row of icons. In other embodiments, the ring included in the user interface may comprise two or more different rows of icons. In instances in which the ring comprises multiple rows of icons, additional rows of icons may be arranged concentrically around the innermost row of icons. Additionally or alternatively, each row of icons may be rotated independently of the other rows of icons.

In some embodiments, one or more icons included in the ring may be user-selectable to launch applications, open documents, and/or perform other actions. For example, a user selection of one icon included in the ring may cause the computing device to launch an application corresponding to the selected application icon. A user selection of another icon included in the ring may cause the computing device to open a document or file corresponding to the selected file icon. Still another selection of a yet another icon included in the ring may cause the computing device to execute one or more other actions (e.g., ejecting a disc, opening a preferences pane, synchronizing an email account, etc.) that may correspond to the selected icon. Although some embodiments are discussed that enable a user of a computing device to navigate applications, files, and/or system functionalities that may be provided by an operating system, other embodiments may enable the user to navigate other content. For example, in some instances, a ring may be presented in accordance with various aspects of the disclosure that enables a user of a computing device to navigate email messages associated with an email client. Such a ring may, for instance, be displayed on and/or otherwise included in a user interface for the email client, and the icons included in the ring may, for instance, correspond to various email messages, email folders, and various functionalities provided via the email client.

In some embodiments, the ring may be rotatable to selectively reveal one or more additional icons that are included in the hidden portion of the ring. In some instances, rotating the ring in this way also may cause one or more icons that were previously visible to become hidden as the ring is rotated. For example, the user can cause the computing device to rotate the ring by providing user input to the computing device. In instances in which a number of applications and/or files are open and/or otherwise in use by a user of the computing device, this functionality can allow the user to quickly and easily learn which applications and/or files are open. Additionally or alternatively, this functionality can allow the user to quickly and easily open and/or switch to another application and/or file from the current application and/or file that may otherwise be in focus.

In some embodiments, the ring may be configured such that a user of the computing device can add one or more icons to the ring by dragging and dropping one or more icons onto the ring. Based on the completion of the drag-and-drop operation, for instance, the computing device may add the dropped icon(s) to the at least one row of icons included in the ring. Additionally or alternatively, the ring may be configured such that a user of the computing device can remove one or more icons from the ring by dragging and dropping one or more icons out of the ring.

In some embodiments, the partially-revealed ring may be displayed along at least one edge of the user interface. The ring may, for example, include one or more controls that allow the ring to be moved into and/or out of the visible area of the user interface and/or along the edge of the visible area of the user interface. Additionally or alternatively, the ring may be movable based on other user input provided to the computing device, such as user input corresponding to user interactions with the ring itself. For example, the user may be able to move the ring into, out of, and/or around in the visible area of the user interface by dragging and dropping the ring (or a portion thereof) to a desired position on the user interface. By placing the ring at and/or along at least one edge of the user interface (and/or the display screen on which the user interface is displayed), the amount of screen area that is used to display the ring can be reduced. This can be particularly beneficial when the ring is used as a navigation menu on a mobile device (e.g., a tablet computer, a smart phone, any other type of mobile computing device, etc.), as such mobile devices typically have relatively small screens. In addition, because the ring can be moved into and out of the visible area of the user interface (and/or the display screen on which the user interface is displayed), additional screen space savings can be realized when the user does not need or wish to view and/or interact with the ring, as the ring can be hidden from view and selectively retrieved when the user needs or wishes to view and/or interact with the ring.

As indicated above, in some embodiments, the ring can be hidden and/or exposed based on user input. In instances in which the ring is to be hidden, the user input that is received may correspond to a user of the computing device pushing the ring into at least one edge of the user interface. For example, the user may select the ring and drag it towards the edge of the user interface (and/or the display screen displaying the user interface) along which the ring is displayed. In other instances in which the ring is to be hidden, the user input that is received may correspond to a user of the computing device simply tapping on and/or otherwise selecting the ring while it is substantially visible.

In instances in which the ring is to be exposed, the user input that is received may correspond to a user of the computing device pulling the ring out of at least one edge of the user interface. For example, the ring may have been previously hidden and/or might not have been initially displayed, yet a handle or a small portion of the ring may be visible in the user interface. In pulling the ring out, the user may select such a handle or small portion of the ring and drag it away from the edge of the user interface (and/or the display screen displaying the user interface) along which the handle or small portion of the ring is displayed. In other instances in which the ring is to be exposed, the user input that is received may correspond to a user of the computing device simply tapping on and/or otherwise selecting a handle or small, visible portion of the ring while the ring is substantially hidden. In some instances, by exposing the ring in this way, the user may cause the ring to be fully revealed, such that the entire contents of the ring are displayed in the visible portion of the user interface.

Figure 3:
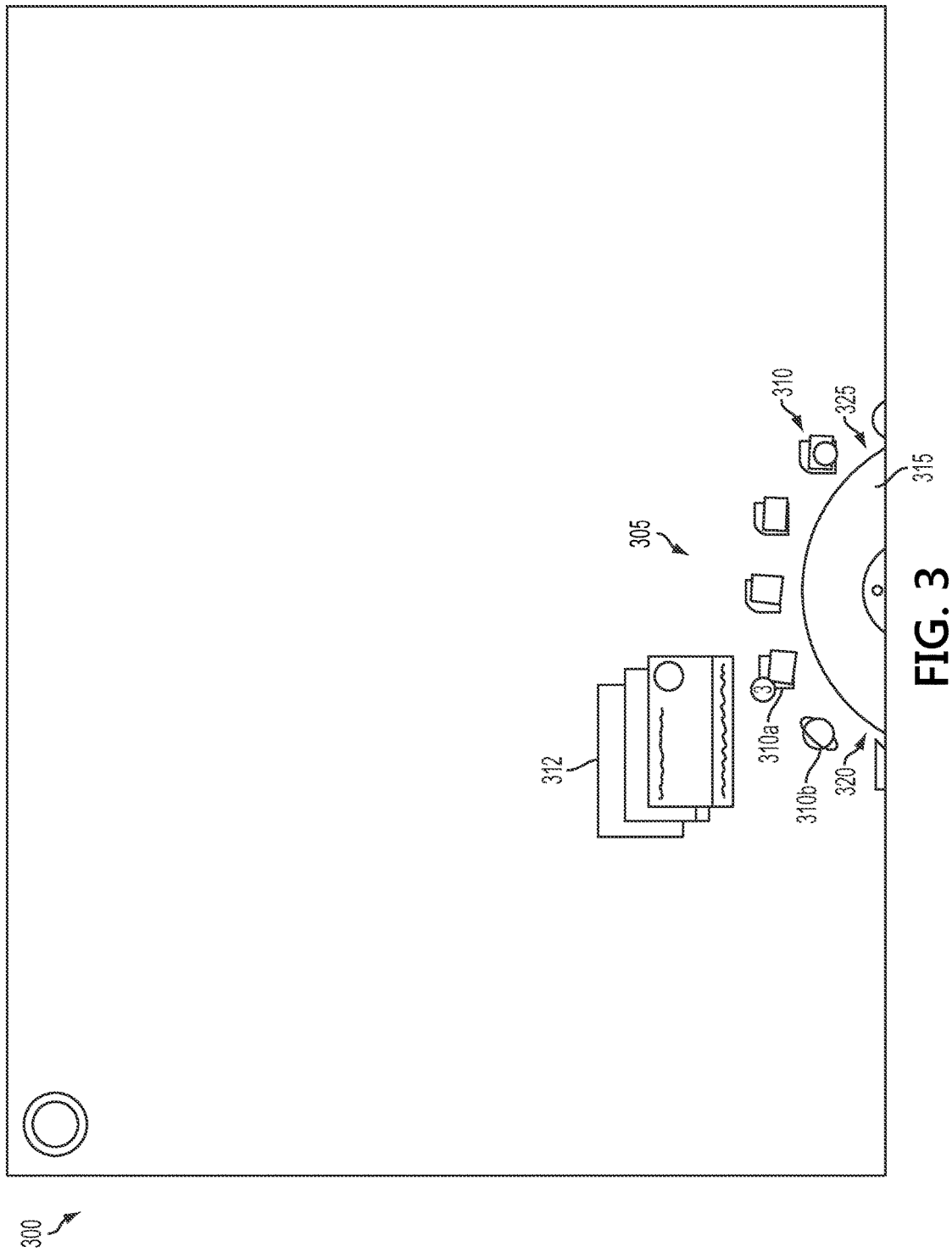
FIG. 3 depicts an example user interface that may be displayed in accordance with one or more illustrative aspects discussed herein.

Having discussed a number of features and functionalities that may be implemented and/or otherwise used in various embodiments, an example user interface that illustrates some features of various embodiments will now be discussed with respect to FIG. 3. In particular, FIG. 3 depicts an example user interface that may be displayed in accordance with one or more illustrative aspects discussed herein. In some embodiments, the example user interface illustrated in FIG. 3 may be displayed by a computing device, such as computing device 100.

In the example illustrated in FIG. 3, user interface 300 includes a partially-revealed ring 305 that includes a row of icons 310. As seen in FIG. 3, the row of icons 310 includes a number of individual icons, such as icons 310*a* and 310*b*. User interface 300 also includes a thumbnail preview 312 of a stack of multiple windows and/or other screens associated with an application corresponding to icon 310*a*. Such a thumbnail preview may, for instance, be displayed by a computing device providing user interface 300 when a cursor hovers over icon 310*a* and/or when a user taps on and/or holds his or her finger down on icon 310*a*. In addition, in accordance with various aspects of the disclosure, a user selection of one of the icons included in the row of icons 310 may cause the computing device providing user interface 300 to launch an application, open a file, or perform some other action corresponding to the selected icon.

As also seen in FIG. 3, ring 305 may have a central portion 315 as well as one or more arrows, such as arrows 320 and 325. By selecting and dragging central portion 315 of ring 305, the user of the computing device may be able to rotate the partially-revealed ring 305. Additionally or alternatively, by clicking on and/or otherwise selecting each of the arrows 320 and 325, the user of the computing device may be able to rotate ring 305 in each direction.

As also seen in FIG. 3, partially-revealed ring 305 is displayed along an edge of user interface 300. This arrangement may conserve the amount of screen space used by ring 305 relative to other aspects of user interface 300. This, in turn, enables a user of the computing device that is providing user interface 300 to quickly and easily navigate through various applications, files, and windows on the computing device by using the unobtrusive ring as a tool for such navigation. In addition, the user may also be able to pull the ring further into the visible area of user interface 300 and/or push the ring out of the visible area of user interface 300 by providing user input as in the examples discussed above.

Figure 4:
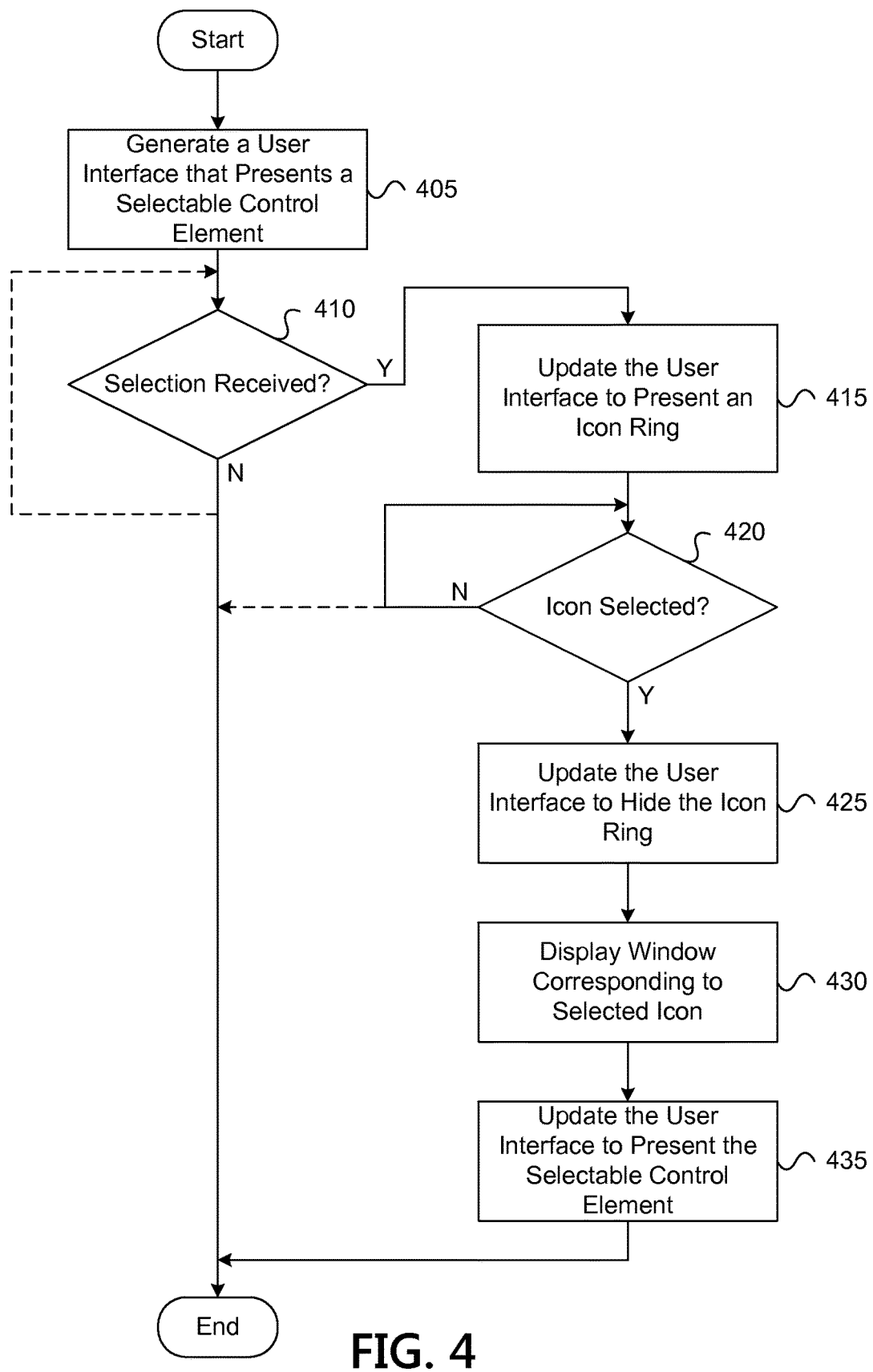
FIG. 4 depicts a flowchart that illustrates another method of providing enhanced user interfaces in accordance with one or more illustrative aspects discussed herein.

FIG. 4 depicts a flowchart that illustrates another method of providing enhanced user interfaces in accordance with one or more illustrative aspects discussed herein. In one or more embodiments, the method illustrated in FIG. 4 and/or one or more steps thereof may be performed by a computing device (e.g., generic computing device 100). Additionally or alternatively, the method illustrated in FIG. 4 and/or one or more steps thereof may, in some instances, be performed by a mobile device (which may implement one or more aspects of a computing device, such as generic computing device 100). In other embodiments, the method illustrated in FIG. 4 and/or one or more steps thereof may be embodied in computer-executable instructions that are stored in a computer-readable medium, such as a non-transitory computer-readable memory.

As seen in FIG. 4, the method may begin at step 405 in which a user interface that presents a selectable control element may be generated. For example, in step 405, a computing device (e.g., generic computing device 100) may generate a user interface that presents a control element that can be selected by a user of the computing device. The user interface may include various elements, such as a desktop, one or more application windows, and other types of content and information that the user of the computing device may be able to view and/or interact with, in addition to the control element. Additionally, the control element may be a user-selectable control element that is presented along an edge of the user interface and/or the display screen on which the user interface may be displayed. For example, the control element may be a circular control element that is relatively small in relation to other elements included in the user interface and that, when selected, causes the icon ring discussed below to be displayed. Additionally or alternatively, the control element may be configured to function as a grip and/or handle that is user-selectable to allow the user to pull the ring out of the edge of the user interface and/or otherwise expose the ring and/or a hidden portion of the ring. In instances in which the control element is configured to function as a grip and/or handle, the control element may similarly be user-selectable to allow the user to push the ring into the edge of the user interface and/or otherwise hide the ring and/or a visible portion of the ring. While the control element may be a circular control element in many examples discussed herein, in other instances, it could be another shape (e.g., rectangular, triangular, etc.). In addition, the control element may be presented as an opaque or semi-transparent overlay above other user interface elements (which may, e.g., include a desktop, application windows, and other types of content and information that may be included in the user interface). An example of a control element may be seen in FIG. 5 and is discussed in greater detail below.

Continuing to refer to FIG. 4, in step 410, it may be determined whether input selecting the control element has been received. For example, in step 410, the computing device may determine whether input selecting the control element has been received from the user of the computing device. In receiving such input, the computing device may, for instance, receive a click, tap, or other selection of the control element that may be presented in the user interface (which may, e.g., be displayed by the computing device). In instances in which the user interface is displayed on a touch-sensitive display screen that is included in and/or connected to the computing device, receiving the input selecting the control element may, for example, include processing one or more electronic signals generated by the display screen in response to the screen being physically contacted by the user's finger or some other object, such as a stylus being operated by the user.

If it is determined, in step 410, that input selecting the control element has not been received, then the method may end. Alternatively, the method may continue executing in a loop and other processing may continue as well. For example, the user interface may continue presenting the control element along with other user interface elements, such as a desktop, one or more application windows, and the like. In addition, other processing of user input (e.g., receiving and processing of user input interacting with other user interface elements) may continue, and the computing device may update the user interface accordingly and/or may perform other actions that may be requested by the user and/or result from the user's actions or background processing. Additionally or alternatively, the computing device may periodically reevaluate whether input selecting the control element has been received.

Alternatively, if it is determined, in step 410, that input selecting the control element has been received, then in step 415, the user interface may be updated to present an icon ring. For example, in step 415, in response to receiving the input selecting the control element, the computing device may update the user interface to present a ring that includes at least one band of icons. In one or more arrangements, the ring may have a first portion that is visible and a second portion, different from the first portion, that is hidden.

For example, the ring may include a scrollable band of icons, and the band of icons may be partially revealed to the user as a result of the ring being positioned along an edge of the user interface, such as the left, right, top, or bottom exterior side of the user interface. Icons in the visible portion of the ring may be presented to the user for selection, and the ring may be scrollable (e.g., the computing device may enable the user to scroll the ring) such that the user can select a previously-hidden icon after scrolling the ring until the desired icon is included in the visible portion of the ring and accordingly presented in the user interface. In one or more arrangements, the icons in the ring may represent various applications, documents, and/or other items that may be open on, running on, stored on, and/or otherwise accessible to the computing device and/or to the user of the computing device. Thus, using the ring, the user of the computing device may be able to open and/or switch to various applications, documents, and/or other items, such as one or more desktops (which may, e.g., be provided by an operating system running on the computing device). In addition, by displaying the ring in response to the selection of the control element, the computing device may enable the user of the computing device to quickly and easily pop out the ring to allow for easy opening of and/or switching to another application, document, or other item.

Figure 6:
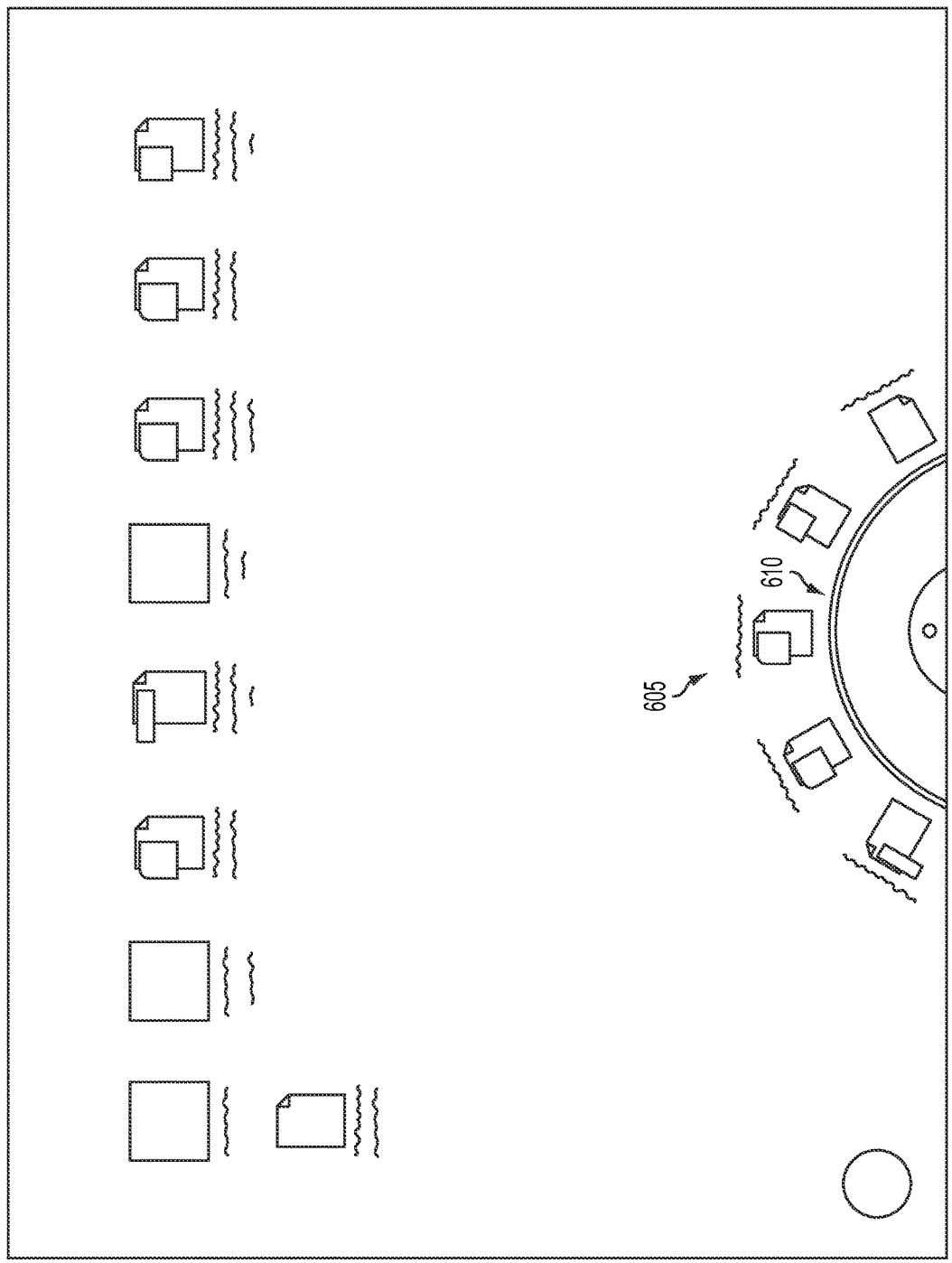

In some arrangements, the one or more icons included in the at least one band of icons may be equally spaced between two or more virtual concentric semi-circular portions, which may be presented as an overlay above other user interface elements. These concentric semi-circular portions may provide borders for the one or more bands of icons, and the computing device may present the overlay using opaque, transparent, and/or semi-transparent fill effects (e.g., solid fills, pattern fills, gradient fills, etc.). In other arrangements, the one or more icons included in the at least one band of icons may be adjacent to and/or spaced along the exterior of one or more of these semi-circular portions. In these arrangements, the icons, along with one or more semi-circular portions, may still be presented as an overlay above other user interface elements, and a variety of opaque, transparent, and/or semi-transparent fill effects may be applied. In presenting such an overlay, the computing device may, for instance, apply different fill effects to the semi-circular portions, the icons themselves, and the other user interface elements which may be presented in the user interface but which are not part of the icon ring, as seen in FIG. 6, for instance, and discussed in greater detail below. In other words, a first set of fill effects may be applied to the semi-circular portions, a second set of fill effects may be applied to the icons, and a third set of fill effects may be applied to the other user interface elements, where the first set of fill effects is different from the second set of fill effects and the third set of fill effects, and where the second set of fill effects is different from the third set of fill effects.

Continuing to refer to FIG. 4, in some embodiments, the ring may be displayed along at least one edge of the user interface. For example, the ring may be displayed along an exterior side of the user interface, such that the ring is presented along the edge of a display screen when displayed by the computing device. Displaying the ring in this way may, for instance, provide particular advantages when the ring is presented on a mobile device, such as a smartphone or tablet computer, as these devices often have relatively small screens compared to desktop computers and other types of personal computers. Thus, using the ring in accordance with various aspects of the disclosure may enable the computing device to utilize limited screen space more efficiently and effectively.

In some embodiments, updating the user interface to present the ring may include initiating a lighting effect adjacent to at least a portion of the ring. For example, the lighting effect may be a glow effect that is provided around the ring after the visible portion of the ring is fully displayed (e.g., after the ring has been popped or slid out from the side of the user interface). Alternatively, the lighting effect (e.g., the glow effect) may be provided around the ring after the ring has been selected (e.g., by the user) and/or after the ring is otherwise in focus. By providing such a lighting effect, the user's attention may be drawn to the ring to encourage the user to interact with the ring (which may, e.g., enable the user to switch between applications and/or documents). Additionally or alternatively, the lighting effect may indicate to the user that the ring is currently in focus, as in some arrangements, the user may be prevented from interacting with other user interface elements (e.g., other than the ring) while the ring is displayed. In other arrangements, the user may be allowed to interact with other user interface elements (e.g., other than the ring) while the ring is displayed, but if the user selects a user interface element other than the ring, the computing device may automatically update the user interface to hide the ring and instead present the control element.

In step 420, it may be determined whether an icon included in the ring has been selected. For example, in step 420, the computing device may determine whether a selection of an icon included in the at least one band of icons has been received. In receiving such input, the computing device may, for instance, receive a click, tap, or other selection of a specific icon displayed in the band of icons included in the ring. In instances in which the user interface is displayed on a touch-sensitive display screen that is included in and/or connected to the computing device, receiving a selection of an icon included in the at least one band of icons may, for example, include processing one or more electronic signals generated by the display screen in response to the screen being physically contacted by the user's finger or some other object, such as a stylus being operated by the user.

If it is determined, in step 420, that a selection of an icon included in the ring (e.g., an icon included in the at least one band of icons included in the ring) has not been selected, then the method may end. Alternatively, the method may continue executing in a loop (e.g., until a selection of an icon is ultimately received) and other processing may continue as well. For example, the user interface may continue presenting the ring and/or other user interface elements, other processing of user input may continue, and the computing device may update the user interface accordingly and/or may perform other actions that may be requested by the user and/or result from the user's actions or background processing. In addition, the computing device may periodically reevaluate whether a selection of an icon included in the ring has been received. In some instances, the ring may, for example, be automatically hidden if a selection of an icon is not received after a predetermined amount of time has elapsed since the ring was initially presented (e.g., in step 415).

Alternatively, if it is determined, in step 420, that a selection of an icon included in the ring (e.g., an icon included in the at least one band of icons included in the ring) has not been selected, then in step 425, the user interface may be updated to hide the ring. For example, in step 425, in response to receiving the selection of the icon, the computing device may update the user interface to hide the ring.

In one or more arrangements, the ring may thus be hidden based on the computing device receiving user input. For example, the ring may, in some instances, be hidden automatically after the user makes a selection, and a window (e.g., a document window, an application window, etc.) corresponding to the selected icon may be displayed. In other instances, the ring may be hidden after user input pushing and/or dragging the ring into at least edge of the user interface is received (e.g., by the computing device). In updating the user interface to hide the ring, the computing device may, for example, remove an overlay (which may, e.g., include concentric semi-circular portions and band(s) of icons that may make up the icon ring) that might have been previously presented and may instead display the underlying user interface elements and/or any other portions of the user interface other than the icon ring. In some instances, in removing such an overlay, the computing device may, for example, animate the ring as scrolling and/or sliding off of the side of the user interface concurrently as other portions of the user interface are displayed or revealed (e.g., concurrently as other windows, controls, and/or other user interface elements are displayed or revealed).

In step 430, a window corresponding to the selected icon may be displayed and/or caused to be displayed. For example, in step 430, a window corresponding to the icon that was selected in step 420 may be displayed by the computing device and/or may be caused to be displayed by the computing device (e.g., on one or more display devices). In some instances, in displaying this window, the computing device may apply a fade-in effect and/or one or more other animation effects concurrently as the ring is hidden and/or as other user interface elements are replaced and/or otherwise hidden by the window being displayed in step 430.

In step 435, the user interface may be updated to present the control element. For example, after the icon ring is hidden, the computing device may update the user interface to again display the control element along the side of the user interface and/or display screen. In some instances, in re-displaying the control element, the computing device may, for instance, animate the control element as scrolling and/or sliding into view along the side of the user interface and/or display screen after the ring is hidden and/or currently as the window is displayed (e.g., in step 430).

In some embodiments, each icon in the at least one band of icons may correspond to an open application. For example, the icon ring may be configured to function as an application switcher and thus may include at least one icon for each application that is open and/or running on the computing device. In some arrangements, only a subset of the icons included in the ring may be displayed at once, as at least some of the icons may be included in the hidden portion of the ring, but the user may scroll through the ring to view and select a desired icon. In some instances, the icon ring also may include an icon for each document that is open and/or running on the computing device. A document may, in some instances, be considered "open" simply if the document is open in an application on the computing device, even if an application window associated with the document (e.g., a window for viewing and/or editing the document) is minimized, hidden, and/or otherwise not visible. One or more applications may likewise be considered "open" even in instances in which their corresponding application windows are minimized, hidden, and/or otherwise not visible, if, for instance, the one or more applications are nevertheless running and/or otherwise being executed. In other instances, all of the icons included in the icon ring may correspond to applications, while in other instances, all of the icons included in the icon ring may correspond to documents.

In some embodiments in which each icon corresponds to an open application, a first icon included in the at least one band of icons may correspond to a first application having two or more open windows, and the first icon may have a counter overlay indicating the number of open windows of the first application. For example, an application, such as a word processing application, may have multiple open windows, and each window may correspond to a different document. Instead of having multiple icons in the icon ring for each of the open windows, the ring may be presented to include only one icon for the application, but may further include a counter overlay on top of the icon for the application. The counter overlay may, for instance, indicate how many windows are open for the particular application. So, if there are two documents open in separate windows within the word processing application, for instance, a counter overlay with the number "2" may be presented above or adjacent to the icon for the word processing application. In this way, documents and/or other items associated with the same application may be clustered, and a numerical marker may be displayed to communicate to the user that the application has multiple open windows.

In some embodiments in which each icon corresponds to an open application and a first icon has a counter overlay, the method discussed above may further include receiving input selecting and holding the first icon, and responsive to receiving such input, updating the user interface to present a cluster of thumbnails, where each thumbnail corresponds to a different open window of the first application. For example, in executing the method discussed above with respect to FIG. 4, the computing device may receive input selecting and holding an icon that has a counter overlay, for example, after the ring is presented in step 415 and before a selection of an icon is received in step 420. In response to receiving the input selecting and holding the this icon, the computing device may update the user interface to present a cluster of thumbnails, where each thumbnail corresponds to a different open window of the application corresponding to the selected and held icon. In this way, the computing device may enable a user to press and hold an icon having a counter overlay (e.g., for more than a predetermined amount of time) to cause a stack or other cluster of thumbnails to be displayed. Referring back to FIG. 3, an example of such a stack of thumbnails 312 is displayed in connection with icon 310*a*. In some instances, additional preview text associated with each thumbnail may also be displayed adjacent to and/or above such a stack of thumbnails, so as to provide the user of the computing device with additional information about the documents that may be open in a particular application.

In some additional and/or alternative embodiments, each icon in the at least one band of icons may correspond to an open document. For example, rather than functioning as an application switcher, as in some of the examples discussed above, the icon ring may function as a document switcher and might only include icons for open documents. Additionally, filenames for the documents included in the ring may be presented above and/or adjacent to corresponding icons in some instances where the ring may function as a document switcher. An example of a view in which the ring includes icons for various documents is illustrated in FIG. 6, which is discussed in greater detail below.

In some embodiments, the icon ring may be scrollable. For example, the computing device may be configured to respond to user input selecting and/or rotating the ring by updating the user interface and/or otherwise updating the display to spin the ring and thus scroll through the icons included in the ring. In some embodiments in which the ring is scrollable, the user interface may be configured to rotate the ring in response to input scrolling the ring. Such input may, for instance, be received by the computing device presenting the user interface. For example, the user interface may be configured to spin the icon ring and its contents (e.g., the icons included in the icon ring) based on user input scrolling the ring (e.g., from left to right, right to left, clockwise, counterclockwise, etc.). Additionally or alternatively, rotating the ring may cause at least one icon included in the first portion of the ring to be moved to the second portion of the ring. For example, when the icon ring is rotated, one or more icons included in the first portion of the ring (which may, e.g., be the visible portion of the icon ring) may be moved to the second portion of the ring (which may, e.g., be the hidden portion of the icon ring). Additionally or alternatively, when the icon ring is rotated, one or more icons included in the hidden portion of the ring may be moved into the visible portion of the ring. Thus, by spinning and/or otherwise rotating the ring, the computing device and/or a user of the computing device may be able to scroll through the icons included in the icon ring, thus enabling the user to select a particular icon. In addition, the icons included in the icon ring may be fixed in position relative to the icon ring itself, and as the icon ring is spun or otherwise rotated as a result of a scroll command, one or more icons may thus be spun, rotated, and/or otherwise shifted along with the icon ring, such that one or more icons may be wholly or partially moved from the visible portion of the icon ring to the hidden portion of the ring and, correspondingly, one or more icons may be wholly or partially moved from the hidden portion of the ring to the visible portion of the ring.

FIGS. 5-9 depict additional example user interfaces that may be displayed in accordance with one or more illustrative aspects discussed herein. In one or more embodiments, the example user interfaces illustrated in FIGS. 5-9 may be displayed and/or otherwise presented by a computing device, such as computing device 100.

Figure 5:
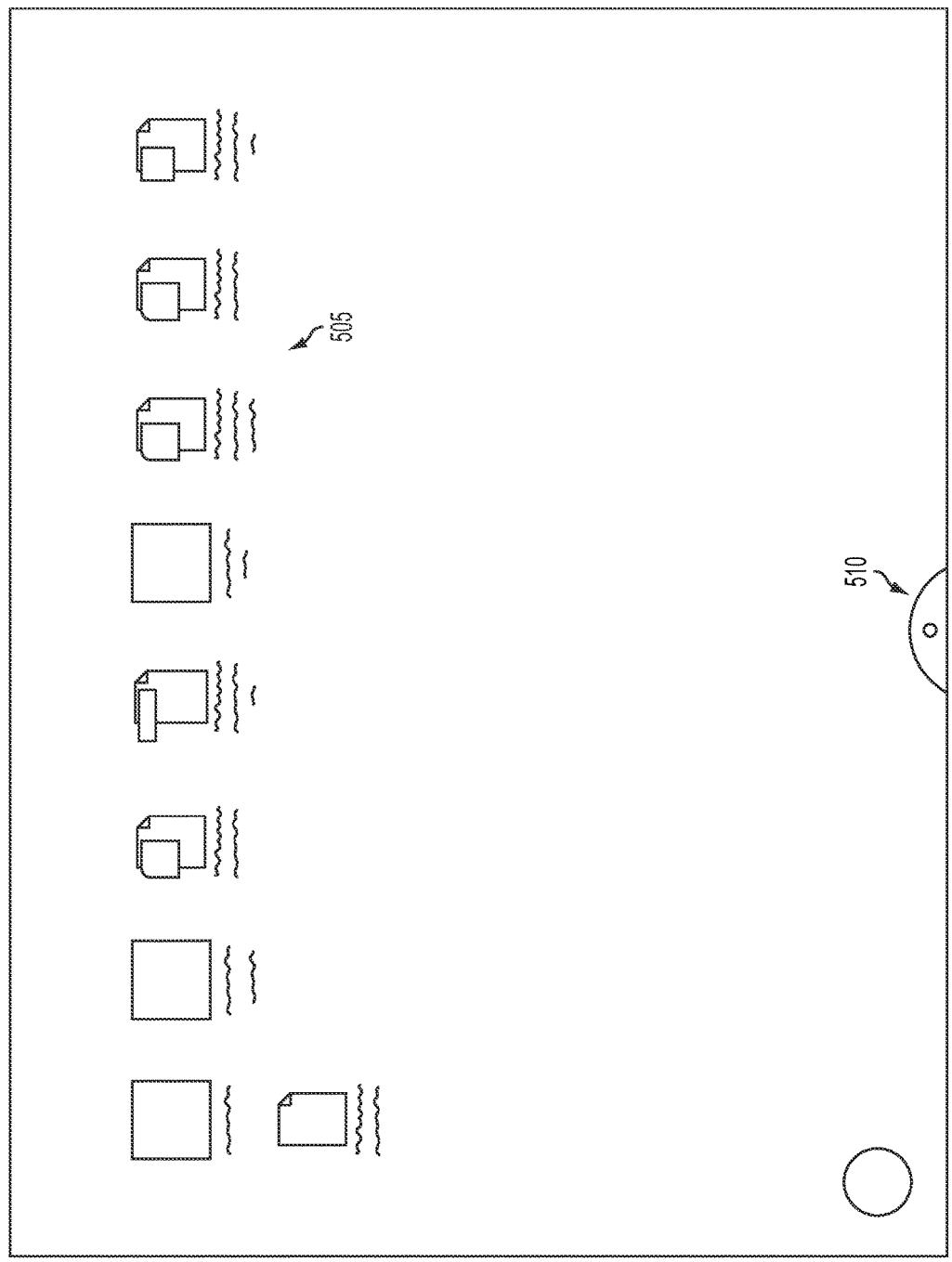
FIGS. 5-9 depict additional example user interfaces that may be displayed in accordance with one or more illustrative aspects discussed herein.

In the example illustrated in FIG. 5, user interface 500 includes a desktop 505 and a control element 510. Desktop 505 may include one or more icons that may correspond to different applications, documents, and other items that are stored on and/or accessible to the computing device presenting user interface 500, and each icon may be user-selectable to open the corresponding icon. In addition, control element 510 may implement various aspects of the control elements discussed above.

For example, in response to a selection of control element 510, an icon ring may be displayed and/or otherwise presented, as seen in FIG. 6. In particular, in the example illustrated in FIG. 6, user interface 600 includes an icon ring 605, which may be displayed and/or otherwise presented in response to receiving a selection of the control element 510 shown in the previous example.

As seen in FIG. 6, the icons included in ring 605 may be displayed in a band along an outer edge of a border circle 610. In other arrangements, the icons of ring 605 may be displayed within concentric border circles. In the illustrated example, the icons included in ring 605 may correspond to various documents and/or other files, and the name of each document or file may be displayed above the corresponding icon in the ring 605. In one or more arrangements, the ring 605 may be configured to rotate around its center when scrolled, and a user of the computing device presenting user interface 600 may be able to scroll the ring 605 to view different icons for different documents and files. In addition, the icons included in ring 605 may be selectable so that the user can choose to open and/or view a particular document by selecting the icon corresponding to the particular document. In the illustrated example, the icons included in ring 605 may correspond to documents that are currently open within various applications on the computing device presenting user interface 600. In other instances, the icons included in ring 605 may correspond to and/or provide access to all of the documents that are stored on and/or accessible to the computing device, regardless of whether such documents are currently open within an application on the computing device, and a user of the computing device may be able to select an icon included in ring 605 to open a document in a corresponding viewer or editor for the selected document.

Figure 7:
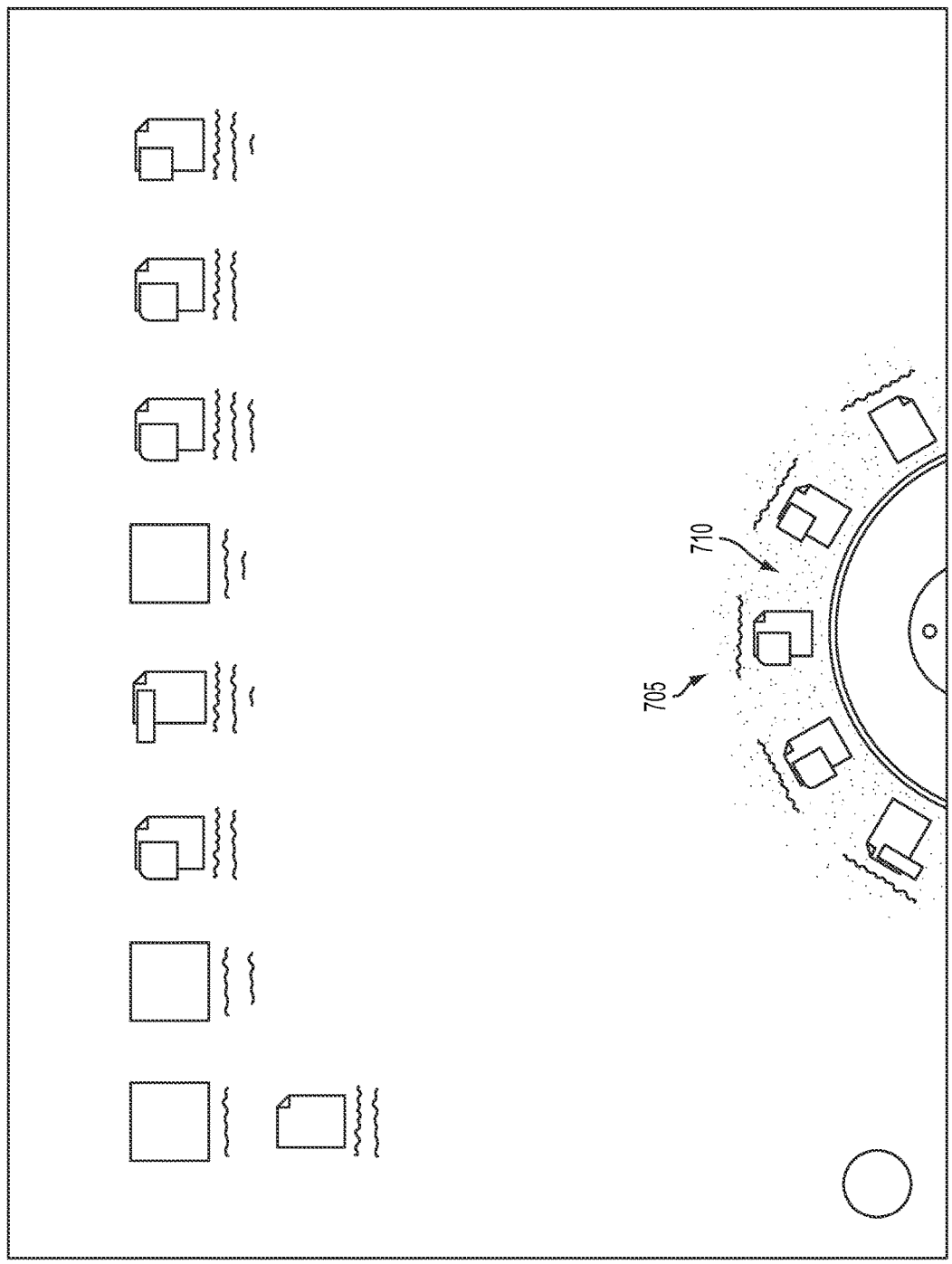

In the example illustrated in FIG. 7, user interface 700 includes an icon ring 705, and a lighting effect 710 is presented in the user interface 700. In particular, a glow effect is provided around the icons included in the icon ring 705, and the glow effect may indicate that the ring 705 has been selected by a user of the computing device presenting user interface 700, that the user is scrolling the ring 705, and/or that the user is otherwise interacting with the ring.

Figure 8:
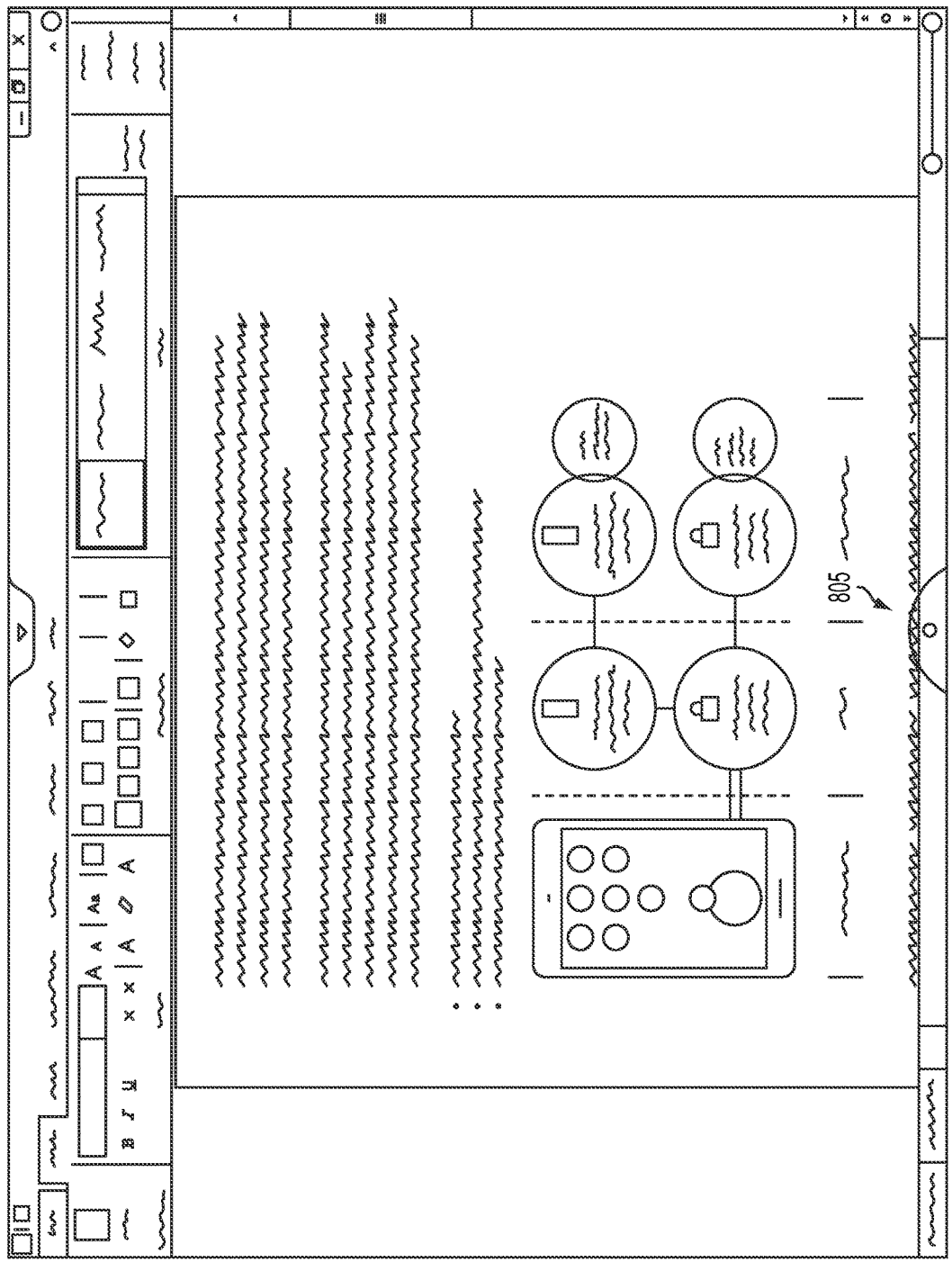

After a user selects an icon included in the ring 705, a document corresponding to the selected icon may be presented, as well as an application that enables the document to be viewed and/or edited, as seen in FIG. 8. For instance, in the example illustrated in FIG. 8, user interface 800 includes a document within an application window, and the document may correspond to an icon selected by the user in the previous example. In addition, in the illustrated example, the icon ring has been hidden, and a control element 805 is once again displayed. As seen in FIG. 8, the control element 805 may consume substantially less screen space than the ring 705 shown in the previous example, thereby allowing the user to more easily view, edit, and/or otherwise interact with the open document and other user interface elements after selecting an icon from the ring. Because the control element 805 is smaller than the icon ring and positioned along an edge of the user interface 800, the control element 805 may be easily accessible to the user without intruding on the document and/or other user interface elements with which the user may be primarily interacting. In particular, should the user wish to switch to a different application or document, the user can simply click on and/or otherwise select the control element 805, which may then cause the icon ring to be displayed again so as to allow the user to switch between applications and/or documents.

Figure 9:
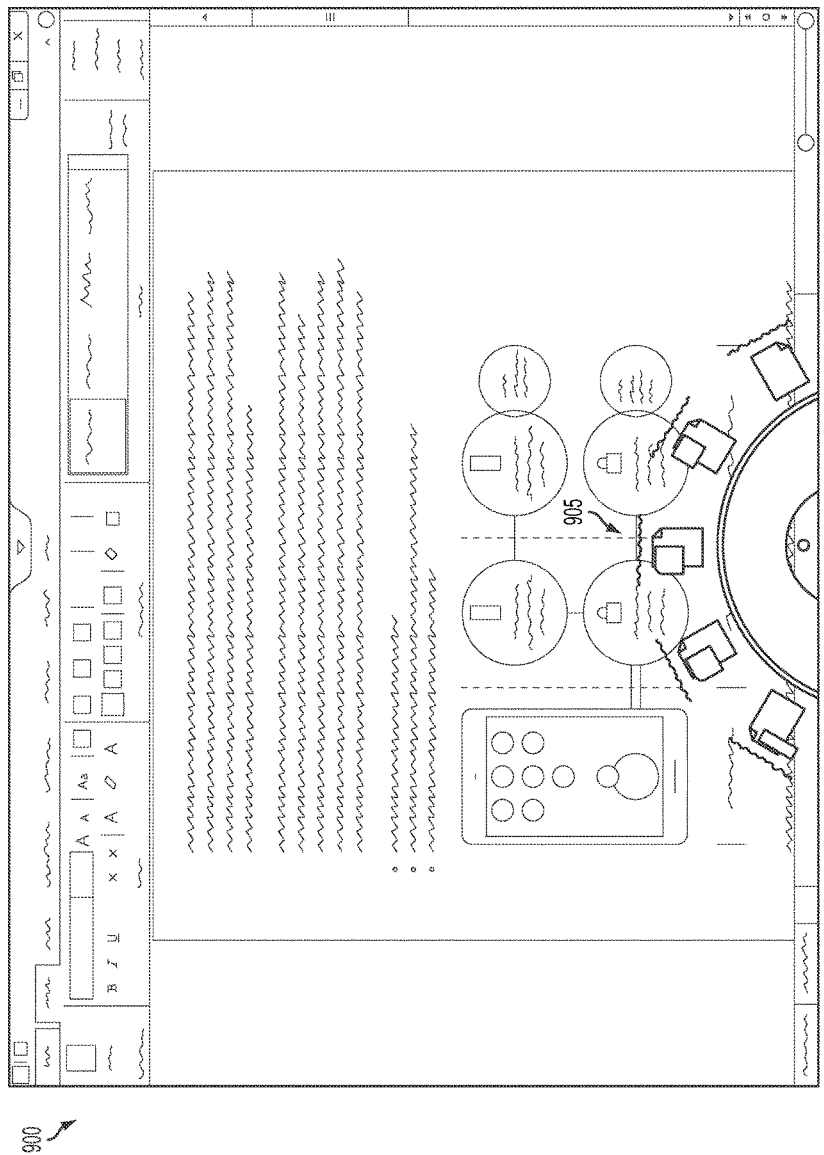

For example, if the user selects the control element 805, an icon ring may again be displayed, as seen in FIG. 9. For instance, in the example illustrated in FIG. 9, user interface 900 includes an icon ring 905 that is presented as an overlay above the previously-displayed document, its corresponding application window, and other user interface elements seen in FIG. 8. Additionally, in the example illustrated in FIG. 9, a fade-out effect has been applied to the previously-displayed document, its corresponding application window, and the other user interface elements, so as to make the ring 905 more prominent.

In accordance with various aspects of the disclosure, a user of the computing device presenting user interface 900 may scroll through the ring 905 to view other documents and applications (which may, e.g., be open on the computing device) and may select an icon included in the ring 905 to switch to another document and/or application. As discussed above, the computing device and/or the user interface 900 may be configured to respond to input scrolling the ring 905 by spinning and/or otherwise rotating the ring 905, such that one or more icons included in the hidden portion of the ring 905 are moved into the visible portion of the ring 905, and correspondingly, one or more icons included in the visible portion of the ring 905 are moved into the hidden portion of the ring 905. In addition, the user may be able to select the icon corresponding to the document that is already open in user interface 900 (but which, e.g., has been temporarily faded-out) to hide the ring 905 and return to editing the document. Additionally or alternatively, the user may be able to click, tap, or otherwise select the faded-out portion of user interface 900 (e.g., where the document, its corresponding application window, and the other user interface elements are presented) to cause the computing device to hide the ring 905, redisplay the control element, and allow the user to return to editing and/or otherwise interacting with the document and the other user interface elements that appear below the overlay associated with the ring 905 in FIG. 9.

Figure 10:
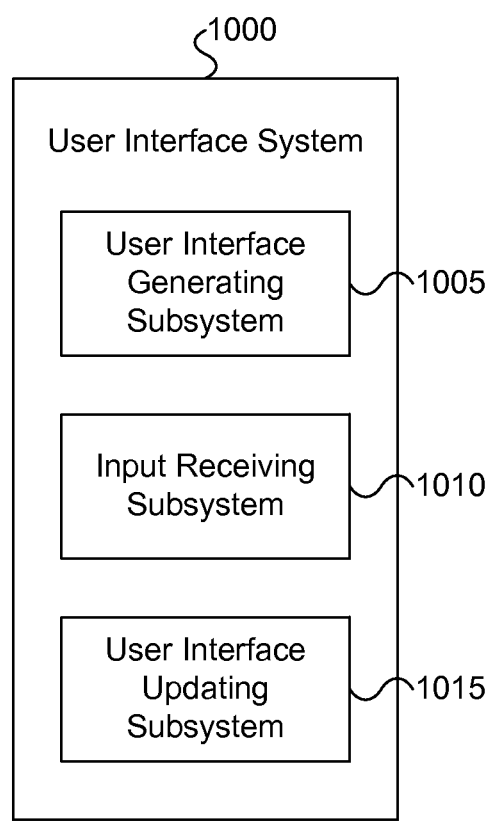
FIG. 10 depicts an example of a system for providing enhanced user interfaces in accordance with one or more illustrative aspects discussed herein.

FIG. 10 depicts an example of a system 1000 for providing enhanced user interfaces in accordance with one or more illustrative aspects discussed herein. As seen in FIG. 10, system 1000 may be configured to provide and/or implement various aspects of the disclosure. In some embodiments, system 1000 may include various subsystems that all may be implemented in computer-executable instructions that are stored and/or executed by a single computing device. In other embodiments, system 1000 and its various subsystems may be implemented in computer-executable instructions that are stored and/or executed by multiple different computing devices. For example, each subsystem included in system 1000 may be a separate, specifically-configured computing device, and each separate computing device may be communicatively coupled to enable operation of the system.

In one or more embodiments, system 1000 may include a user interface generating subsystem, an input receiving subsystem 1010, and a user interface updating subsystem 1015. The configuration of system 1000 illustrated in FIG. 10 is one example configuration of system 1000 that may be used in some arrangements. In other arrangements, system 1000 may include additional and/or alternative subsystems in addition to and/or instead of those illustrated and discussed herein.

In some embodiments, user interface generating subsystem 1005 may be configured to generate a user interface that presents a control element. For example, user interface generating subsystem 1005 may draw and/or render a user interface, and in drawing and/or rendering such a user interface, subsystem 1005 may cause a control element to be presented as an overlay above one or more other user interface elements that may be included in the user interface, such as a desktop, one or more application windows, and/or other user interface elements. As discussed above, the control element may be user-selectable, and an icon ring may be displayed in response to system 1000 receiving a selection of the control element (e.g., from a user of system 1000).

In some embodiments, input receiving subsystem 1010 may be configured to receive and/or process input, such as user input received from a user of system 1000. For example, input receiving subsystem 1010 may be configured to determine whether input selecting a control element included in a user interface generated by subsystem 1005 has been received. This may, for instance, include receiving and/or processing signals received from other components included in system 1000, such as signals generated by and/or received from a touch-sensitive display screen coupled to and/or included in system 1000 and on which the user interface may be displayed and/or otherwise presented.

In some embodiments, user interface updating subsystem 1015 may be configured to update the user interface presented by system 1000. For example, subsystem 1015 may be configured to update the user interface generated by subsystem 1005 based on user input received by subsystem 1010. In some instances, subsystem 1015 may thus update the user interface to present an icon ring response to subsystem 1010 receiving user input selecting a control element included in the user interface generated by subsystem 1005.

As illustrated above, various aspects of the disclosure relate to providing enhanced user interfaces. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method, comprising:
generating, by a computing device comprising a touch-sensitive display screen, a user interface that presents a circular control element;
receiving, by the computing device, touch-based user input selecting the circular control element via the touch-sensitive display screen;
in response to receiving the touch-based user input selecting the circular control element via the touch-sensitive display screen, updating, by the computing device, the user interface to present a ring comprising at least one band of icons, the ring having a first portion that is visible and a second portion, different from the first portion, that is hidden, wherein each icon in the at least one band of icons corresponds to a first application having two or more open windows, the first icon having a counter overlay indicating a number of open windows in the first application;
receiving, by the computing device, touch-based user input pressing and holding the first icon for more than a predetermined amount of time via the touch-sensitive display screen;
in response to receiving the touch-based user input pressing and holding the first icon for more than the predetermined amount of time via the touch-sensitive display screen, updating, by the computing device, the user interface to present a cluster of thumbnails while the first icon is being held, each thumbnail of the cluster of thumbnails corresponding to a different open window on the first application;
receiving, by the computing device, touch-based user input selecting an icon included in the at least one band of icons via the touch-sensitive display screen;
in response to receiving the touch-based user input selecting the icon included in the at least one band of icons via the touch-sensitive display screen, updating, by the computing device, the user interface to hide the ring and to launch a user interface element from a plurality of user interface elements, wherein the user interface element corresponds to the selected icon;
after updating the user interface to hide the ring, receiving, by the computing device, touch-based user input selecting the circular control element to grip the ring via the touch-sensitive display screen and touch-based user input pulling the ring out of an edge of the user interface via the touch-sensitive display screen;
in response to receiving the touch-based user input selecting the circular control element to grip the ring via the touch-sensitive display screen and the touch-based user input pulling the ring out of the edge of the user interface via the touch-sensitive display screen, updating, by the computing device, the user interface to present the ring and to fade out all other user interface elements different from the ring;
receiving, by the computing device, touch-based user input selecting a faded-out portion of the user interface while the ring is presented via the touch-sensitive display screen; and
in response to receiving the touch-based user input selecting the faded-out portion of the user interface while the ring is presented via the touch-sensitive display screen, updating, by the computing device, the user interface to hide the ring and to fade in one or more of the other user interface elements different from the ring.

2. The method of claim 1, wherein updating the user interface to present the ring comprises initiating a lighting effect adjacent to at least a portion of the ring.

3. The method of claim 1,
wherein the ring is scrollable,
wherein the user interface is configured to rotate the ring in response to input scrolling the ring, and
wherein rotating the ring causes at least one icon of the first portion of the ring to be moved to the second portion of the ring.

4. The method of claim 1, wherein the ring comprises a first band of icons and a second band of icons, the second band of icons being arranged concentrically around the first band of icons, and wherein the second band of icons is rotated independently of the first band of icons.

5. The method of claim 4, wherein the second band of icons is associated with an email client and wherein one or more icons in the second band of icons correspond to one or more email messages or email folders.

6. The method of claim 1, wherein at least one icon in the at least one band of icons is added to the ring via a drag-and-drop operation.

7. The method of claim 1, comprising:
receiving, by the computing device, touch-based user input pushing the ring to the edge of the user interface via the touch-sensitive display screen; and
in response to receiving the touch-based user input pushing the ring to the edge of the user interface via the touch-sensitive display screen, updating, by the computing device, the user interface to hide the ring and present the circular control element.

8. The method of claim 1, wherein the circular control element is presented as a semi-transparent overlay above other user interface elements.

9. The method of claim 1, wherein the at least one band of icons is presented between two or more concentric semi-circular portions that are presented as a semi-transparent overlay above other user interface elements.

10. The method of claim 9, comprising:
receiving, by the computing device, touch-based user input selecting a second icon in the at least one band of icons via the touch-sensitive display screen; and
in response to receiving the touch-based user input selecting the second icon in the at least one band of icons via the touch-sensitive display screen, updating, by the computing device, the user interface to remove the semi-transparent overlay by animating the ring as sliding off of a side of the user interface concurrently as other user interface elements are revealed.

11. A computing device, comprising:
at least one processor;
a touch-sensitive display screen; and
memory storing computer-readable instructions that, when executed by the at least one processor, cause the computing device to:
generate a user interface that presents a circular control element;

receive touch-based user input selecting the circular control element via the touch-sensitive display screen;

in response to receiving the touch-based user input selecting the circular control element via the touch-sensitive display screen, update the user interface to present a ring comprising at least one band of icons, the ring having a first portion that is visible and a second portion, different from the first portion, that is hidden, wherein each icon in the at least one band of icons corresponds to an open application, and wherein a first icon included in the at least one band of icons corresponds to a first application having two or more open windows, the first icon having a counter overlay indicating a number of open windows of the first application;

receive touch-based user input pressing and holding the first icon for more than a predetermined amount of time via the touch-sensitive display screen;

in response to receiving the touch-based user input pressing and holding the first icon for more than the predetermined amount of time via the touch-sensitive display screen, update the user interface to present a cluster of thumbnails while the first icon is being held, each thumbnail of the cluster of thumbnails corresponding to a different open window of the first application;

receive touch-based user input selecting an icon included in the at least one band of icons via the touch-sensitive display screen;

in response to receiving the touch-based user input selecting the icon included in the at least one band of icons via the touch-sensitive display screen, update the user interface to hide the ring and to launch a user interface element from a plurality of user interface elements, wherein the user interface element corresponds to the selected icon;

after updating the user interface to hide the ring, receive touch-based user input selecting the circular control element to grip the ring via the touch-sensitive display screen and touch-based user input pulling the ring out of an edge of the user interface via the touch-sensitive display screen;

in response to receiving the touch-based user input selecting the circular control element to grip the ring via the touch-sensitive display screen and the touch-based user input pulling the ring out of the edge of the user interface via the touch-sensitive display screen, update the user interface to present the ring and to fade out all other user interface elements different from the ring;

receive touch-based user input selecting a faded-out portion of the user interface while the ring is presented via the touch-sensitive display screen; and in response to receiving the touch-based user input selecting the faded-out portion of the user interface while the ring is presented via the touch-sensitive display screen, update the user interface to hide the ring and to fade in one or more of the other user interface elements different from the ring.

12. The computing device of claim 11, wherein updating the user interface to present the ring comprises initiating a lighting effect adjacent to at least a portion of the ring.

13. The computing device of claim 11,
wherein the ring is scrollable,
wherein the user interface is configured to rotate the ring in response to input scrolling the ring, and
wherein rotating the ring causes at least one icon of the first portion of the ring to be moved to the second portion of the ring.

14. The computing device of claim 11, wherein the ring comprises a first band of icons and a second band of icons, the second band of icons being arranged concentrically around the first band of icons, and wherein the second band of icons is rotated independently of the first band of icons.

15. The computing device of claim 14, wherein the second band of icons is associated with an email client and wherein one or more icons in the second band of icons correspond to one or more email messages or email folders.

16. The computing device of claim 11, wherein at least one icon in the at least one band of icons is added to the ring via a drag-and-drop operation.

17. The computing device of claim 11, wherein the memory stores additional computer-readable instructions that, when executed by the at least one processor, cause the computing device to:
receive touch-based user input pushing the ring to the edge of the user interface via the touch-sensitive display screen; and
in response to receiving the touch-based user input pushing the ring to the edge of the user interface via the touch-sensitive display screen, update the user interface to hide the ring and present the circular control element.

18. The computing device of claim 11, wherein the circular control element is presented as a semi-transparent overlay above other user interface elements.

19. The computing device of claim 11, wherein the at least one band of icons is presented between two or more concentric semi-circular portions that are presented as a semi-transparent overlay above other user interface elements.

20. One or more non-transitory computer-readable media having computer-executable instructions stored thereon that, when executed, cause a computing device comprising a touch-sensitive display screen to:
generate a user interface that presents a circular control element;
receive touch-based user input selecting the circular control element via the touch-sensitive display screen;
in response to receiving the touch-based user input selecting the circular control element via the touch-sensitive display screen, update the user interface to present a ring comprising at least one band of icons, the ring having a first portion that is visible and a second portion, different from the first portion, that is hidden, wherein each icon in the at least one band of icons corresponds to an open application, and wherein a first icon included in the at least one band of icons corresponds to a first application having two or more open windows, the first icon having a counter overlay indicating a number of open windows of the first application;
receive touch-based user input pressing and holding the first icon for more than a predetermined amount of time via the touch-sensitive display screen;
in response to receiving the touch-based user input pressing and holding the first icon for more than the predetermined amount of time via the touch-sensitive display screen, update the user interface to present a cluster of thumbnails while the first icon is being held, each thumbnail of the cluster of thumbnails corresponding to a different open window of the first application; receive touch-based user input selecting an icon included in the at least one band of icons via the touch-sensitive display screen;

in response to receiving the touch-based user input selecting the icon included in the at least one band of icons via the touch-sensitive display screen, update the user interface to hide the ring and to launch a user interface element from a plurality of user interface elements, wherein the user interface element corresponds to the selected icon;

after updating the user interface to hide the ring, receive touch-based user input selecting the circular control element to grip the ring via the touch-sensitive display screen and touch-based user input pulling the ring out of an edge of the user interface via the touch-sensitive display screen;

in response to receiving the touch-based user input selecting the circular control element to grip the ring via the touch-sensitive display screen and the touch-based user input pulling the ring out of the edge of the user interface via the touch-sensitive display screen, update the user interface to present the ring and to fade out all other user interface elements different from the ring;

receive touch-based user input selecting a faded-out portion of the user interface while the ring is presented via the touch-sensitive display screen; and in response to receiving the touch-based user input selecting the faded-out portion of the user interface while the ring is presented via the touch-sensitive display screen, update the user interface to hide the ring and to fade in one or more of the other user interface elements different from the ring.

\* \* \* \* \*